United States Patent [19]
Sudo

[11] Patent Number: 5,723,189
[45] Date of Patent: *Mar. 3, 1998

[54] CONTAINER FOR A SANITARY ARTICLE

[75] Inventor: Morihiro Sudo, Sumida-Ku, Japan

[73] Assignee: Daikyo Gomu Seiko Ltd., Tokyo, Japan

[*] Notice: The term of this patent shall not extend beyond the expiration date of Pat. No. 5,288,560.

[21] Appl. No.: 277,307

[22] Filed: Jul. 22, 1994

Related U.S. Application Data

[63] Continuation of Ser. No. 916,747, Jul. 22, 1992, abandoned.

[30] Foreign Application Priority Data

Jul. 22, 1991 [JP] Japan ................. 3-181164
Jul. 8, 1992 [JP] Japan ................. 4-181044

[51] Int. Cl.$^6$ ............................................. B29D 23/00
[52] U.S. Cl. ............. 428/36.9; 428/36.91; 428/36.92; 428/35.7; 428/36.6; 428/36.7; 428/36.8
[58] Field of Search ............... 428/34.7, 35.7, 428/35.8, 36.6, 36.7, 36.8, 36.9, 36.91, 36.92; 525/210, 211, 227, 177, 184; 526/308, 281

[56] References Cited

U.S. PATENT DOCUMENTS

| | | | |
|---|---|---|---|
| 3,919,227 | 11/1975 | Andreades et al. | 260/85.5 R |
| 4,882,210 | 11/1989 | Romberg et al. | 428/34.7 |
| 4,992,511 | 2/1991 | Yamamoto et al. | 525/97 |
| 5,288,560 | 2/1994 | Sudo et al. | 428/494 |

Primary Examiner—James J. Seidleck
Assistant Examiner—Michael A. Williamson
Attorney, Agent, or Firm—Wenderoth, Lind & Ponack

[57] ABSTRACT

A container for a sanitary article capable of stably preserving, while making sure of sanitary property for a long time, materials legally provided by the Japanese Pharmacopoeia, the Food Sanitation Act, etc., for example, pharmaceuticals such as vaccine, antiobiotics, vitamines, sugars, amino acids, electrolytes, etc., materials needing sanitary property, such as nutriments, transfusion liquids, cosmetics, seasonings and other foods is provided. This container comprises a material containing a resin formed of a cyclic olefin compound or a bridged polycyclic hydrocarbon compound, as a polymeric component.

10 Claims, 4 Drawing Sheets

CONTAINER FOR A SANITARY ARTICLE

This application is a continuation of Ser. No. 07/916,747, filed Jul. 22, 1992, now abandoned.

BACKGROUND OF THE INVENTION

1. Field of the Invention

This invention relates to a container for a sanitary article and more particularly, it is concerned with containers capable of stably preserving, while making sure of sanitary property for a long time, materials legally provided by the Japanese Pharmacopoeia, the Food Sanitation Act, etc., for example, pharmaceuticals such as vaccine, antibiotics, vitamines, sugars, amino acids, electrolytes, etc., materials needing sanitary property, such as nutriments, transfusion liquids, cosmetics, seasonings and other foods.

2. Description of the Prior Art

From old times, glass materials have been used as the most suitable containers from sanitary standpoint for pharmaceuticals, nutriments, transfusion liquids, foods, etc. Many of these glass materials are soda lime glasses, which can readily be produced and worked with a low cost. However, this soda lime glass has such a property that alkali components are subject to more elution and glass fine grains tend to be stripped and accordingly, when using as a container for pharmaceuticals, it has been carried out to add to a content a buffer agent for controlling pH, a deterioration inhibitor of a content, an antioxidant, etc. Alternately, a borosilicate glass with less alkali components has been used for the production of tube bottles or vial containers. However, the borosilicate is not complete and has some problems and in order to solve the problems, there have been proposed a method comprising coating the inner surface of a glass bottle with sulfur, sulfur dioxide gas, ammonium sulfate, etc. to reduce generation of floated fine particles in a medicament or to decrease the water repellency of a glass surface or a method comprising spraying or coating a silicone oil or modified silicone compound onto the inner surface of a glass container and then subjecting to a heat treatment at about 250° to 300° C., as disclosed in Japanese Patent Laid-Open Publication No. 165466/1982.

As the latest technique, there are a method comprising coating the inner surface of a container with a metal oxide and subjecting to a heat treatment (Japanese Patent Laid-Open Publication No. 192436/1990) and a method comprising heating and coating the inside of a glass container with a rubber-like styrene type block copolymer (Japanese Patent Laid-Open Publication No. 222738/1986).

As to the glass quality when using a glass material as a material for a pharmaceutical container, there are provided standard values in the Japanese Pharmacopoeia of 12th Revision (referred to as JP 12), "Test Method of Glass Container for Injection"; US Pharmacopoeia XXI (referred to as USP); and British Standard 3263 (referred to as BS).

Of late, new problems have arised in addition to the above described problems. One of them is that when dosing the human body with an injection liquid in a glass bottle, the liquid is flown out of the neck of the bottle and at the same time, air containing bacteria in a sickroom enters the bottle, whereby the liquid is contaminated with the bacteria, charged in a syringe and dosed in the human body.

As well known in the art, a glass ampoule is charged with a liquid medicament and enclosed, so it is the severest container as an enclosed container. When using the glass ampoule, however, it is scratched by a file, etc. and snapped, during which broken glass particles are included in a liquid medicament and dosed as it is.

Many of foods such as oils, etc. and pharmaceuticals tend to be deteriorated by lights, ultraviolet rays, etc. In order to prevent such deteriorations, iron or manganese compounds are added to glass materials, but this causes a problem that these metal compounds are stripped from the surface of a glass container and included, as fine particles, in contents such as foods or pharmaceuticals.

In place of the glass containers having such problems, plastic containers have widely been used. As an official regulation therfor, there is the regulation of Japanese Pharmacopoeia of 8th Revision (1971) as polyethylene (PE), polypropylene (PP) and polyvinyl chloride. Furthermore, there is a test method of a plastic container for liquor transfusion, as provided in US Pharmacopoeia XVII (USP), British Standard (BS), French Pharmacopoeia, Swiss Pharmacopoeia, Northern Pharmacopoeia and West Germany Industrial Standard (referred to as DIN 58 365). This is also provided in the Food Sanitation Act, according to Official Notification Nos. 370 and 20 of the Ministry of Health and Welfare (February of 1982) and Food Additive Support F of FDA (US).

Plastics have a large feature of light weight, but on the other hand, they have various problems that, for example, PVC has a softening point of 60° to 100° C. and water absorbing property and moisture permeability and during working, additives such as plasticizers (DOP, DOA), stabilizers (heavy metal or light metal salts) or PVC monomer is floated or subject to elution, resulting in sanitary problems.

PE having a softening point of 115° to 125° C. is doubtful whether it is suitable for use as a material resisting to sterilization at a high temperature. In addition, PE is not suitable as a material of a container for storage for a long time, because of having a very large absorption and permeability of oxygen, air, inert gases (nitrogen, etc.) and carbon dioxide, resulting in oxidation of a content. This is an opaque resin.

PP is also a material tending to oxidize and deteriorate a content and to give out a stench, because of having a very large absorption and permeability of oxygen, air, inert gases, etc. in the similar manner to PE. PP is an opaque and non-flexible resin. Furthermore, PP has many other problems, as a material for a container, that it tends to be hardened and broken, in particular, during steam sterilization or high pressure steam sterilization. Therefore, compositions or copolymers comprising PP with other monomers have often been used, but in this case, many problems also arise.

Polyethylene terephthalate (PET) is a resin having often been used as a container for pharmaceuticals or foods. This resin has not only high steam permeability, but also high permeability of other gases such as oxygen and is so weak against acids or alkalis that a container formed thereof is hard to be fixed and tends to be deformed.

Ethylene-vinyl acetate copolymer (EVA) tends to be aged, i.e. oxidized by heat and oxygen and to readily release an odor and has a property such as to adsorb contents or pharmaceuticals.

Polyvinylidene chloride or vinylidene chloride-vinyl chloride copolymer (PVDC) with high purity tends to be thermally decomposed and colored and has low workability. Since the monomers tends to appear, a plasticizer or stabilizer is added. Thus, elution of the plasticizer or stabilizer takes place.

Comparison of the properties of the above described resins and commercially available resins is carried out to obtain results shown in Table 1, in which PS represents polystyrene, PC polycarbonate, nylon polycaprolactam, LDPE low density polyethylene, MDPE middle density polyethylene and HDPE high density polyethyelene.

TABLE 1

| Material | Barrier Steam | Property gas | Trans-parency | Water Proof Property | Heat resistance | Cold Proof Property | Strength | Workability |
|---|---|---|---|---|---|---|---|---|
| LDPE | ○ | X | ○ | ◎ | △ | ○ | X | ◎ |
| MDPE | ○ | X | ○ | ◎ | △ | ○ | X | ◎ |
| HDPE | ◎ | X | △ | ◎ | ○ | ○ | X | ◎ |
| PP | ○ | X | ○ | ◎ | ○ | △ | △ | ● |
| PET | ○ | ○ | ◎ | ○ | ○ | ◎ | ◎ | ◎ |
| PVC | ○ | ○ | ◎ | ○ | △ | △ | ○ | ● |
| PS | △ | X | ◎ | ○ | ○ | ○ | ○ | ● |
| PC | △ | X | ◎ | ○ | ◎ | ◎ | ◎ | ○ |
| Nylon | △ | ◎ | ◎ | △ | ◎ | ○ | ◎ | ◎ |
| EVA | △ | X | ○ | ○ | △ | ◎ | ○ | ○ |
| PVDC | ● | ◎ | ○ | ○ | ○ | ○ | ○ | ○ |

Estimation of the properties in Table 1 is carried out according to:

●: best; ◎: better; ○: good; △: fairly good; X: not good

As shown in Table 1, PVDC is "good" in the estimation, but is not suitable for pharmaceuticals because of having a problem on the elution of a plasticizer or stabilizer, as described above. Since there is no resin capable of having estimation of at least "better" as to all the items, a container formed of any one of the above described resins meets with deterioration of a content in a short time and it is hard to maintain the initial quality.

Therefore, it has been taken into consideration to combine at least two plastics to obtain a composite or laminated container or packing material and a light height container capable of preventing oxygen, air or light from permeation or transmission therethrough has been rendered commercially available. When PE or PVC weak in heat is combined with a heat resisting material, a container can be obtained capable of resisting to such heat as required for sterilization. Combinations of plastics, having been known at the present time and having a relatively high sanitary property, are exemplified in Table 2.

TABLE 2

| Combined (Laminated) Material | Permeability of Oxygen | Permeability of Water |
|---|---|---|
| PET/Al/PE | | at most 1 |
| PET/PE | | at least 12 |
| PET/EVOH/LDPE | 0.3–1.0 | 0.9–2.1 |
| Nylon/EVOH/LDPE | 6 | 8 |
| Nylon/PVDC/PP | 4.2 | 2.1 |
| PP/EVOH/PE | 4 | 6 |
| PE/EVOH/PE | 4 | 7 |

In addition to the above described combinations, PE/Nylon/PE, PET/Nylon/PET, Nylon or PVDC/PE, PET/PVDC/PE, PP/Nylon/PE, Nylon/PE, Al for molding/PP, PE/EVA/LDPE, PVDC/PP/PE, PVC/PE and PC/PP are known.

Generally, when plastics are subjected to biaxial stretching, the hardness and tensile strength are increased, the permeability of oxygen or air is lowered, i.e. the gas barrier property is improved and the transparency is also improved. Therefore, a plastic container obtained by injection molding a resin, heating again, stretching (in many cases, blow stretching) and cooling is applied to a container for oils, soy sauce, miso (soya bean), etc., but has unsatisfactory properties.

SUMMARY OF THE INVENTION

It is an object of the present invention to provide a container for a sanitary article, whereby the above described many problems can be resolved.

It is another object of the present invention to provide a container for a sanitary article, whereby foods, nutriments, pharmaceuticals, cosmetics, seasonings, etc. can be preserved for a long period of time with maintaining the initial quality thereof at the time of producing.

These objects can be attained by a container for a sanitary article consisting of a material containing a resin formed of a cyclic olefin compound or a bridged polycyclic hydrocarbon compound, as a polymeric component.

BRIEF DESCRIPTION OF THE DRAWINGS

The accompanying drawings are to illustrate the principle and merits of the present invention in detail.

FIGS. 3a&b are cross-sectional views of a container for transfusion of a liquid, consisting of a cyclic resin of the present invention.

FIGS. 5 a&b are cross-sectional views of another bottle consisting of a cyclic resin of the present invention, the neck of which is enclosed by a rubber stopper.

DETAILED DESCRIPTION OF THE INVENTION

The inventors have made various studies to develop a container capable of stably preserving, while making sure of sanitary property for a long time, pharmaceuticals such as vaccine, antiobiotics, vitamins, sugars, amino acids, electrolytes, etc., materials needing sanitary property, such as nutriments, transfusion liquids, cosmetics, seasonings and other foods and consequently, have found that a resin formed of a cyclic olefin compound or a bridged polycyclic hydrocarbon compound, as a polymeric component, is effective for this purpose.

Accordingly, the present invention provides a container for a sanitary article consisting of a material containing a resin formed of a cyclic olefin compound or a bridged polycyclic hydrocarbon compound, as a polymeric component.

As the above described cyclic olefin compound in the present invention, there are preferably used monocyclic olefin compounds and their alkyl derivatives and acrylate derivatives.

As the above described bridged polycyclic hydrocarbon compound in the present invention, there are particularly preferably used those having at least one unsaturated bond in the ring or susbtituent.

In the present invention, a resin comprising the above described cyclic olefin compound or bridged polycyclic hydrocarbon compound, as a polymeric component, (which will hereinafter be referred to as "cyclic resin") can contain at least one of lower olefins, aromatic compounds or lower olefin or aromatic vinyl monomers, as a copolymeric component, and can be a mixture with olefin resins and/or synthetic rubbers.

Furthermore, the cyclic resin of the present invention is preferably one having any one of properties, a bromine number of at most 1 and a softening point of at least 130° C.

In addition, the present invention provides a container for a saniatry article, having at least one laminated layer on the surface of the container, at least one of the laminated layers consisting of a material containing a resin comprising a cyclic olefin compound as a polymeric component, in particular, the container body to be laminated with the cyclic olefin resin or resin composition being formed of a glass, metal or plastic.

Of late, characteristic resins have been developed by new techniques as to separation or purification of monomers of $C_5$ to $C_9$ fractions and polymerization catalysts of the monomers and above all, a marked progress appears in polymers of the cyclic olefin monomers.

The inventors have found that a resin comprising a cyclic olefin compound or bridged polycyclic hydrocarbon compound, as a polymeric component, is a non-crystalline material having excellent properties regarding alkali resistance, acid resistance, water proof property and chemical resistance, and having a high melting point, heat resistance, oxidation resistance and transparency, and is a very excellent resin as a container material for a sanitary article, being capable of passing a test of Japanese Pharmacopoeia and being readily molded. The present invention is based on this finding.

Examples of the compound to be the polymeric component of the cyclic resin used as a container material for a sanitary article according to the present invention will further be illustrated in detail.

The cyclic olefin compounds include, for example, monocyclic olefin compounds such as:

cyclopentadiene (referred to as CPD)

cyclopentene methylcyclohexene dimethylcyclohexene cyclooctene lower alkyl derivatives of these monocyclic olefin compounds having 1 to 3 lower alkyl groups such as methyl, ethyl group, etc., substituted, acrylate derivatives and the like.

As the bridged polycyclic hydrocarbon compound, it is particularly preferable to use bridged cyclic hydrocarbon compounds containing two or more rings, in particular, bridged polycyclic olefin compounds and derivatives thereof, or bridged polycyclic saturated hydrocarbon compounds having unsaturated double bonds in the substituents thereof, illustrative of which are bridged polycyclic cycloalkene compounds and lower alkyl derivatives, aryl derivatives or aralkyl derivatives thereof and vinyl derivatives, allyloxycarboxy derivatives and (meth)acryloxy derivatives of bridged polycyclic cycloalkane compounds.

bicyclo[2,2,1]-2-heptoene bicyclo[2,2,1]-2,5-heptodiene ethyl-bicyclo[2,2,1]-2-heptoene ethylidene-bicyclo[2,2,1]-2-heptoene (ethylidene-2-norbornane)

phenyl-bicyclo[2,2,1]-hepto-2-ene dicyclo[4,3,0]-3,8-nonadiene tricyclo[4,3,0,1$^{2,5}$]-3-decene tricyclo[4,3,0,1$^{2,5}$]-3,8-decene (3,8-dihydro-dicyclopentadiene)

tricyclo[4,4,0,1$^{2,5}$]-3-undecene tetracyclo[4,4,0,1$^{2,5}$,1$^{7,10}$]-3-dodecene dimethyl-tetracyclo[4,4,0,1$^{2,5}$,1$^{7,10}$]-3-dodecene ethylidene-tetracyclo[4,4,0,1$^{2,5}$,1$^{7,10}$]-3-dodecene pentacyclo[7,4,0,1$^{2,5}$,0,0$^{8,13}$,1$^{9,12}$]-3-pentadecene dimethyl-hexacyclo[6,6,1,1$^{3,8}$,1$^{10,13}$,0$^{2,7}$,0$^{9,14}$]-4-heptadecene pentacyclo[6,5,1,1$^{3,6}$,0$^{2,7}$0$^{9,13}$]-4-pentadecene ethylidene-ethyl-tetracyclo[4,4,0,1$^{2,5}$,1$^{7,10}$]-3-dodecene bis(allyloxycarboxy)tricyclo[4,3,0,1$^{2,5}$]-decane bis(methacryloxy)tricyclo[4,3,0,1$^{2,5}$]-decane bis(acryloxy)tricyclo[4,3,0,1$^{2,5}$]-decane methyloxycarbonyltetracyclo[4,4,0,1$^{2,5}$,1$^{7,10}$]-3-dodecene hexacyclo[6,6,1,1$^{3,8}$,1$^{10,13}$,0$^{2,7}$,0$^{9,14}$]-4-heptadecene In the cyclic resin of the present invention, at least one of the above described cyclic olefin compounds and bridged polycyclic hydrocarbon compounds is used as a polymeric component and further lower olefins, aromatic compounds or vinyl monomers of lower olefins or aromatic compounds can be contained as a copolymeric component.

Examples of these other polymeric components are ethylene, propylene, isoprene, butadiene, methylpentene, norbornene, butene, vinyltoluene and the like.

Synthesis of the cyclic resin of the present invention can be carried out in known manner, for example, as disclosed in Japanese Patent Publication Nos. 11818/1972, 43412/1983, 1442/1986 and 19761/1987, and Japanese Patent Laid-Open Publication Nos. 75700/1975, 129434/1980, 127728/1983, 168708/1985, 115916/1986, 271308/1986, 221118/1988, 243103/1088 and 180976/1990.

Specifically, the following three classified methods can be utilized:

(1) method for obtaining a bridged cyclic hydrocarbon resin, comprising subjecting an olefin or cyclic olefin to addition cyclization reaction (Diels Alder Reaction) to form a bridged cyclic hydrocarbon monomer, polymerizing the monomer in a solvent using aluminum, an alkylaluminum compound, vanadium compound, tungsten compound or boron compound as a catalyst to form a resinous material and purifying the resin.

(2) method for obtaining the cyclic resin of the present invention, comprising polymerizing a monomer to be the polymeric component of the cyclic resin of the present invention, for example, a lower alkylcycloalkene compound, cycloalkadiene compound, bridged polycyclic alkadiene compound, bridged polycyclic alkene compound or the like in a solvent, using a vanadium compound, aluminum compound, tungsten compound, boron compound, etc., to form a hgih molecular weight resinous material and then hydrogenating the resinous material by the use of a nickel or platinum catalyst.

(3) method for obtaining the cyclic resin of the present invention, comprising polymerizing an acryloyl derivative of a bridged polycyclic compound by light and/or an organo peroixde to obtain a bridged cyclic resin and then purifying the resin.

In the above described three polymerization reactions, a monomer of an olefin compound or aromatic compound can further be added to obtain a corresponding copolymer.

In any of the aboved described polymerization methods, the presence of the monomers used as the polymeric component, low molecular weight oligomers, metallic catalysts, etc. in the cyclic resin of the present invention is not preferable with respect to generation of odor and deterioration of the sanitary property.

Therefore, the cyclic resin of the present invention should preferably be a resin having a softening point of at least 130° C. (ASTM D1525).

The cyclic resin has preferably a bromine number of at most 1 (JIS K2543), since if it is more than 1, coloration or discoloration takes place in a sanitary container for a sanitary article. As a countermeasure for this coloration or discoloration, an age resistor is added.

Examples of the age resistor added to the cyclic resin of the present invention include 2-6-di-t-butyl-4-methylphneol (BHT), octadecyl-3-(4'-hydroxy-3',5'-di-t-butylphenyl) propionate (Irganox 1076—commercial name—made by Ciba Geigy Co.), tetrakis[methylene(3,5-di-butyl-4-hydroxyphenyl) propionate]methane (Irganox 1010—commercial name—made by Ciba Geigy Co.), tocopehenol, 4,'4'-thiobis(6-t-butyl-3-methylphenol) (Antage RC—commercial name—made by Kawaguchi Kagaku KK), bis(2,2,6,6-tetramethylpiperidyl) sebacate (Sanol LS-770—commercial name—made by Sankyo KK), 1,3,8-triaza-7,7,9,9-tetramethyl-n-octylspiro[4,5]decane-2,4-dione (Sanol LS-772—commercial name—made by Sankyo KK), distearyl thiodipropionate (Antigen TPS—commercial name—made by Sumitomo Kagaku KK), pentaerythritol-tetrakis(β-lauryl-thio-propionate) (Sumilizer TPD—commercial name—made by Sumitomo Kagaku KK), 1,3,5-trimethyl-2,4,6,-tris(3,5-di-t-butyl-4-hydroxybenzyl) benzene (Ionox 330—commercial name—made by ICI) and tris(2,4-di-t-butylphenyl) phosphite (Irganox 168—commercial name—made by Ciba Geigy Co.).

These age resistors function to prevent the cyclic resin of the present invention from gelling by heat, light or oxygen. The amount of the age resistor to be added is generally 0.1 to 1 part by weight to 100 parts by weight of the cyclic resin.

The content of a cyclic olefin monomer in the cyclic resin of the present invention is preferably at least 30 weight % and the molecular weight of the cyclic resin is preferably 5000 to 100000000. A low molecular weight resin is highly viscous, but a high molecular weight resin is powdered.

In working a resin, i.e. shaping a resin article, it is preferable to use a working aid, in particular, when the shaping operation is difficult. As the working aid, there is preferably used at least one of higher fatty acids or higher fatty acid esters, silicone oils and fluorinated oils in a proportion of 0 to 10 weight % to 100 parts by weight of the cyclic resin.

The cyclic resin of the present invention has the following properties:

| | |
|---|---|
| Specific Gravity: | 0.98–1.3 (ASTM D792) |
| Tensile Strength: | 200–1000 kg/cm$^2$ (ASTM D638) |
| Tensile Elongation: | 3–300% (ASTM D638) |
| Bending Modulus: | 1–50 × 10$^4$ kg/cm$^2$ (ASTM D790) |
| Softening Point: | 130° C. or higher (ASTM D1525) |
| Transparency: | 90–100% (ASTM D1003) |
| Water Absorption Ratio: | 0.01–0.1% (ASTM D570) |
| Bromine Number: | 0–1 (JIS K2543) |
| JP 12 | |

48 Test method of rubber stopper for transfusion: OK
49 Test method of plastic container for transfusion: OK As described above, the cyclic resin of the present invention is an ultrahigh molecular weight resin having a high softening point, excellent physical properties such as tensile strength, high toughness, high inertness to acids or alkalis, low moisture absorption, low permeability of moisture, oxygen or air, excellent cold resistance or heat resistance, non-crystalline property and transparency.

The cyclic resin or cyclic resin composition of the present invention can further contain at least one of olefin type resins, illustrative of which are various polyethylenes (PE), polypropylenes (PP), nylons including amorphous nylon, PET, PBT, ethylene-acrylic acid copolymers, polybutenes, methylbutene copolymers, ethylene-butene copolymers, methyl-pentene copolymers and graft- or block copolymers of olefin type compounds.

In the present invention, the above described cyclic resin or cyclic resin composition can be a mixture or alloy with a synthetic rubber. Examples of the synthetic rubber are isoprene rubbers, butadiene rubbers, ethylene-propylene rubbers, ethylene-propylene-diene-terpolymers, butadiene-isoprene copolymers, isoprene-isobutylene rubbers and the like.

When the cyclic resin of the present invention is mixed with resinous or rubbers, as described above, the cyclic resin is preferably present in a proportion of at least 30 weight % to the total composition, since if the content of the cyclic resin is less than 30 weight %, the sanitary property characteristic of the present invention, e.g. alkali resistance cannot sufficiently be given so that there is little difference from vessels or containers of usual resins.

The container for a sanitary article according to the present invention can be prepared by shaping the cyclic resin or cyclic resin composition of the present invention as it is or laminating the same with another resin. Examples of the other resin are ethylene-vinylalcohol copolymer resins (EVOH), polyvinylalcohol (PVA), ethylene-vinyl acetate copolymers or saponified products thereof (EVA), nylons including amorphous nylon, ethylene-vinyl copolymer resins, PE, PP, PET, polymethylpentenes, PVDC, acrylic resins, acrylic modified resins, ethylene-propylene copolymer resins, ethylene-butene copolymer resins and graft- or block copolymers of olefin compounds.

In the above described container for a saniatry article of the present invention, the presence of the cyclic resin and polar group-containing resin, laminated and bonded with each other, results in improvement of the quality guarantee of a content in the container. During the same time, a good bonding can be realized by the use of a laminated layer consisting of a mixture of both the resins or with an adhesives and the sanitary property of the cyclic resin can further be improved.

For the purpose of preventing a content in a container from deterioration by light (ultraviolet rays, UV) or oxidation, a UV absorber or UV shielding agent can be added to a resin to be laminated. Examples of the UV absorber or UV shielding agent are p-t-butylphenyl salicylate, 2,4-dihydroxybenzophenone, 2-hydroxy-4-methoxybenzophenone, 2(2'-hydroxy-5'-methylphenyl) benzotriazole, 2(2'-hydroxy-3'-t-butyl-5'-methylphenyl)-5-chlorobenzotriazole, 2(2'-hydroxy-3',5'-di-t-butylphenyl)-5-chlorobenzotriazole, bis(2,2,6,6-dimethyl-4,4-piperidine) sebacate (Sanol LS 770—commercial name— made by Ciba Geigy Co.), hindered amine of polymer type (Sanol LS 944—commercial name—made by Ciba Geigy Co.), fine grain titanium oxide or zinc oxide and the like. These UV absorbers or shielding agents can be used, individually or in combination, in a proportion of 0.01 to 2 weight %.

The cyclic resin of the present invention is characterized by having a very high sanitary property. As the first item for the estimation thereof, the cyclic resin of the present invention is capable of passing the test method of pharmaceuticals, that is, JP 12, USP, BS, ISO, etc. Furthermore, the cyclic resin of the present invention can pass a high grade test relating to pharmaceutical and sanitary property and accordingly, is suitable for use as a container or packaging material of cosmetics and foods. For the container for foods, in particular, oils or soy sauce, it is required to sterilize by heating, to have an air oxidation resistance, to maintain perfume, to easily transport, etc. similarly to pharmaceuticals.

On the other hand, there are a number of sanitary articles or materials such as foods, cosmetics, pharmaceuticals, etc. and correspondingly considering the convenience of conveying or tranporting, the aesthetical appearance and shape as goods value, the most important maintenance of quality, etc., various containers, for example, large drums, barrels (for liquors), cans, bottles, cases or sacks, vials, PTP (Press Through Pack), SP (slip pouch), partitioned vessels, ampoules and the like are used. The cyclic resin of the present invention can be applied to any of these containers.

More specifically, the container of the present invention is capable of maintaining the quality of medicaments for a long time even if they are very unstable, for example, maintaining many of antibiotic substances having hygroscopic property and tendency of being air-oxidized at a potency of 90 to 110 for 3 to 5 years. Hormones being unstable for the formulation are ordinarily subjected to freeze drying, during which the container of the present invention can favorably be applied to the freeze drying. In the case of injection liquids, the cyclic resin of the present invention is suitable for packing three kinds of an amino acid, grape sugar and electrolyte (salt, etc.) in the form of a transparent sack capable of maintaining well the quality and being readily conveyed, for example, to dose an emergency patient. Furthermore, the cyclic resin of the present invention can be applied to many kinds of containers such as capsules of pellets, tablets, or PTP packs with such a large feature that the quality of medicaments or contents is maintained as they are prepared for a long period of time.

The sanitary container of the present invention can be produced by directly shaping the cyclic resin or cyclic resin composition of the present invention or laminating it with another material, as illustrated above. Alternately, the surfaces of containers of other materials, for example, glasses, metals, plastics, etc. can be laminated with the cyclic resin of the present invention in known manner by coating, bonding, fusion bonding or applying a film of the cyclic resin of the present invention.

Production of a container for a sanitary article using the cyclic resin of the present invention can be carried out by a known technique of shaping an olefin resin. As a mixing means, there can be used Brabenders, plastographs, monoaxial or biaxial extruders, strong screw type mixers, Banbury mixers, kneader rolls, etc. Moreover, various shaping means can be employed, for example, by injection, compression, extrusion (meet shaping, blow shaping), etc. That is, the cyclic resin is heated, plasticized and mixed in a screw, rolled by means of a T-die to form a film, followed by fusion-bonding, thus obtaining a sack-shaped pack. During the same time, other resins such as nylon, PVDC, PVOH, PP and PE, paper and aluminum can be co-extruded with the film rolled by a T-die to form a multi-layer film, followed by obtaining a pack or container.

An injection blow system can be applied to shaping of a container using the cyclic resin of the present invention. Thus, when the blow system is combined with an extruding machine, a number of resins can be subjected to multilayer blowing to obtain a container. In the case of such a multilayer blow article, it is possible to obtain containers or packs having nylon, PVDC, EVA, PVOH, PE films laminated and fusion-bonded, which have a very good performance corresponding to the object of use.

The cyclic olefin resin or bridged polycyclic resin is laminated with other resins to form a parrison (which means a plasticized plastic formed into a hollow tube by extruding through an extruding machine or injection molding machine in blow molding and is ordinarily hollow under the state before expansion by air pressure in a metallic mold, but is sometimes a perforated tube, if necessary) and this parrison is then subjected to heating-stretching-cooling to form a stretched container, in particular, biaxially stretched by two times or more. The cyclic resin of the present invention is suitable for this processing.

When the cyclic resin of the present invention is laminated with another resin, subjected to fusion-bonding and then to sterilization at a high pressure, there hardly occur generation of bubbles and stripping. Depending on a combination of the resins, stripping occurs. In this case, the stripped surfaces can be bonded by the use of known adhesives or by using adhesives after sputtering. As the adhesives, there can be used resins containing carbonyl groups such as ionomers, resins containing phthalic anhydride groups, EVA, silane coupling agents and the like, whereby strong bonding can be obtained. Specifically, both of resins to be bonded are suitably mixed and laminated to form a strongly bonded article with two or more layers.

EXAMPLE

Synthesis methods of the cyclic resin according to the present invention and production processes of containers for sanitary articles using the resin or resin composition will be illustrated in detail without limiting the same.

Synthetic Example 1 of Cyclic Resin: DCP Polymer 3.6 liters of purified and dehydrated toluene and 1.2 kg of tricyclo[4.3.0.1$^{2,5}$]-3,8-decene (DCP) were charged in a reactor of 10 liters, equipped with a stirrer, to which 72 g of triethylaluminum, 236 g of triethylamine and 62 g of titanium tetrachloride were added in a nitrogen atmosphere at 5° C., and the mixture was heated to 25° C. and stirred for 24 hours to effect polymerization. Then, the reaction was stopped by adding methanol and the resulting resin was precipitated with methanol, followed by washing with acetoneisopropyl alcohol (1:1) and drying in vacuum at a low temperature, thus obtaining 800 g of a polymer.

The thus obtained polymer was charged in an autoclave of 5 liters, equipped with a stirrer, in the form of a 10 weight % solution in cyclohexane, to which 25 g of palladium carbon was added in a hydrogen atmosphere, followed by replacing by hydrogen, raising the temperature to 120° C. and supplementing hydrogen at a hydrogen pressure of 70 atm to effect hydrogenation for 12 hours. After the hydrogenation, the reaction mixture was subjected to centrifugal separation of the catalyst and then to precipitation in a large amount of a mixed solvent of acetone-isopropyl alcohol (1:1). To 100 parts by weight of the resulting resin were added 0.4 part by weight of BHT and 0.1 part by weight of Antigen TPS (commercial name), as an age resistor, thus obtaining 560 g of a resin (referred to as Resin (a)) having a softening point of 152° C. and a bromine number of 0.2.

Synthetic Example 2 of Cyclic Resin: DCP-Ethylene Copolymer

In a reaction vessel of 10 liters, equipped with a stirrer and dropping funnel, were charged 5 liters of purified and dehydrated toluene and then 350 g of purified and dehydrated DCP, to which maintaining the temperature at lower than 3° C., 105 g of ethylaluminum sesquichloride and 110 g of dichloroethoxyoxovanadium, as a catalyst, were dropwise added while passing a mixed gas of dry ethylene and nitrogen gas (1:2) and stirring at a temperature of 20° C. for 2 hours, thus effecting the polymerization. The copolymerization was stopped by the use of 30 ml of methanol. A copolymer was precipitated in methanol, washed with acetone and subjected to drying in vacuum at a low temperature.

The thus obtained copolymer was charged in a 5-liter autoclave, equipped with a stirrer, in the form of a 10 weight % solution in cyclohexane, to which 25 g of palladium carbon was added in a hydrogen atmosphere, followed by replacing by hydrogen and raising the temperature to 120° C. with agitation. Then, the hydrogen pressure was raised to 70 atm at the same temperature and hydrogen was supplemented at the same pressure to effect hydrogenation for 10 hours. After the hydrogenation, the reaction mixture was subjected to centrifugal separation of the catalyst and then to precipitation in a large amount of a mixed solvent of acetone-isopropyl alcohol (1:1), followed by filtering. To 100 parts by weight of the resulting resin were added 0.6 part by weight of BHT, followed by drying in vacuum, thus obtaining 300 g of a resin (referred to as Resin (b)) having a softening point of 146° C. and a bromine number of 0.1.

Synthetic Example 3 of Cyclic Resin: Copolymer of Bridged Polycyclic Hydrocarbon and Monocyclic Olefin In a reaction vessel of 10 liters, equipped with a stirrer, were charged 4.5 liters of purified and dehydrated toluene and 300 g of mixed monomers of purified and dehydrated hexacyclo[6.6.1.1$^{3,6}$.1$^{10,13}$.0$^{2,7}$.0$^{9,14}$]-4-heptadecene and cyclopentene (1:1), to which 90 g of ethylaluminum sesquichloride and 15 g of dichloroethoxyoxovanadium were dropwise added in a nitrogen atmosphere at a temperature of at most 5° C. After raising the temperature to 10° C., the reaction mixture was stirred for 24 hours to effect the polymerization. The polymerization was then stopped by the use of 150 ml of methanol and the copolymer was precipitated in methanol, followed by washing and filtering. The copolymer resin was then hydrogenated in an analogous manner to Synthetic Example 2. 0.3 part by weight of Irganox 1076 (commercial name) was added to 100 parts by weight of the resulting copolymer, uniformly mixed and dried in vacuum to obtain 160 g of a resin (referred to as Resin (c)) having a softening point of 136°–156° C. and a bromine number of 0.2.

Synthetic Example 4 of Cyclic Resin

In a reaction vessel of 10 liters, equipped with a stirrer, were charged 5 liters of purified and dehydrated cyclohexane and 300 g of purified and dehydrated dimethyltetracyclo[4.4.0.1$^{2,5}$,1$^{7,10}$]-3-dodecene, to which 20 g of dichloroethoxyoxovanadium and 110 g of ethylaluminum sesquichloride were dropwise added in a nitrogen atmosphere at a temperature of at most 5° C. A mixed gases of nitrogen gas: hydrogen gas (150:1) was passed therethrough at a temperature of 10° C. for 15 hours to effect polymerization. The polymerization was then stopped by the use of 1000 ml of isopropyl alcohol and the polymer was precipitated in isopropyl alcohol, followed by washing. 0.1 part by weight of Irganox 168 (commercial name) and 0.2 part by weight of Ionox 330 (commercial name) was added to 100 parts by weight of the resulting polymer and dried in vacuum to obtain 182 g of a resin (referred to as Resin (d)) having a softening point of 141°–150° C.

Synthetic Example 5 of Cyclic Resin 500 g of bis(methacryloxy)tricyclo[4.3.0.1$^{2,5}$]-decane and 500 g of cyclohexane were charged in a reactor of 5 liters, equipped with a stirrer, to which 30 g of benzoyl peroxide was added with passing nitrogen gas, followed by uniformly mixing and gradually heating to 120° C. and effecting the polymerization reaction for 7 hours. After removing the solvent, 30 g of t-butylperoxy-benzoate and 3 g of 4,4'-thiobis(6-t-butyl-3-methylphenol) were uniformly added, heated at a mold temperature of 170° C. for 10 minutes to obtain a resinous powder and adequately washed with warm water, thus obtaining a resin (referred to as Resin (e)) having a softening point of at least 320° C. and a bromine number of 1.3.

Synthetic Example 6 of Cyclic Resin: Bridged Polycyclic Compound

To a reactor of 2 lters, equipped with a stirrer, were charged 250 g of methyloxycarbonyltetracyclo[4.4.0.1$^{2,5}$, 1$^{7,10}$]-3-dodecene, 1000 ml of 2-dichloroethane, 1.9 g of 1-hexene, 46 ml of a chlorobenzene solution of 0.05 mol/liter of tungsten hexachloride as a catalyst, 35 ml of a 1,2-dichloroethane solution of 0.1 mol/liter of paraldehyde and 19 ml of a toluene solution of 0.5 mol/liter of triisobutylaluminum in a nitrogen atmosphere, and the polymerization was carried out at 60° C. for 10 hours. 50 ml of methanol was added to the polymerization system to stop the polymerization, the solvent was evaporated and the product was washed with a mixed solution of acetone-methanol (1:1) and dried in vacuum. The polymerized product was dissolved in 4500 ml of tetrahydrofuran, to which 23 g of a palladium-alumina catalyst containing 5 weight % of palladium was added, and the mixture was then subjected to hydrogenation reaction at a temperature of 170° C. and a hydogen gas pressure of 100 kg/cm$^2$ for 5 hours. Then, the product was treated in an analogous manner to the treatment after the hydrogenation in Synthetic Example 1 of Cyclic Resin to obtain a polymerized resin. 0.5 part by weight of BHT was added to 100 parts by weight of the resin to obtain a resin (referred to as Resin (f)) having a softening point of 147° C. and a bromine number of 0.05.

Synthetic Example 7 of Cyclic Resin

In a reaction vessel of 10 liters, equipped with a stirrer, were charged 5 liters of purified and dehydrated toluene, to which 152 g of purified and dehydrated tetracyclo[4.4.0.1$^{2,5}$, 1$^{7,10}$]-3-dodecene, 19 g of methylcyclohexene, and 18 g of ethylaluminum sesquichloride and 11 g of vanadium oxytrichloride were added and mixed in a nitrogen atmosphere at a temperature of at most 5° C. Mixed gases of ethylene gas:nitrogen gas (1:2) was passed therethrough from a gas feed pipe, the temperature was raised to 10° C. and the polymerization reaction was carried out using 15 liters of the mixed gas for 1 hour. The polymerization was then stopped by the use of 50 ml of methanol and the polymer was precipitated in a large amount of methanol, followed by washing with a mixed solvent of acetone-isopropyl alcohol (1:1). 0.3 part by weight of Irganox 1070 (commercial name) was added to 100 parts by weight of the resulting polymer to obtain a resin (referred to as Resin (g)) having a softening point of at least 152° C. and a bromine number of 0.5.

Synthetic Example 8 of Cyclic Resin

In a reaction vessel of 10 liters, equipped with a stirrer, were charged 7 liters of purified and dehydrated toluene, to which 930 g of tetracyclo[4.4.0, 1$^{2,5}$,1$^{7,10}$]-3-dodecene, 70 g of bicyclo[2.2.1]-2-heptoene, 5 g of 1-hexane, 6 g of tungsten hexachloride and 7 g of tetraphenyls were added, followed by effecting the polymerization at a temperature of 50° C. for 3 hours. After the polymerization, methanol was added thereto to precipitate a resin and the resin was washed with a mixed solution of acetone-methanol (1:1) and dried in vacuum to obtain 980 g of a resin. The resulting resin was hydrogenated in an analogous manner to Synthetic Example 1, thus obtaining 930 g of a resin having a softening point of 155°–160° C. During use of the resin, 0.5 weight % of BHT was added to 930 g of the resin (which will be referred to as Resin (h)).

Examples 1 to 8

Molding Ampoules and Estimation of Same

Resins (a) to (g) of the present invention, obtained in Synthetic Examples of Cyclic Resins as described above, were fused and plasticized at a cylinder temperature of 180° to 260° C. in an extruding machine and injected from a nozzle at a nitrogen pressure of about 6 kg/cm$^2$ at a die inside temperature of 200° to 250° C. and an ampoule mold temperature of 70° to 100° C. to form ampoules each having an ampoule volume of 20 ml and a thickness of 30 μm.

Figure 1:
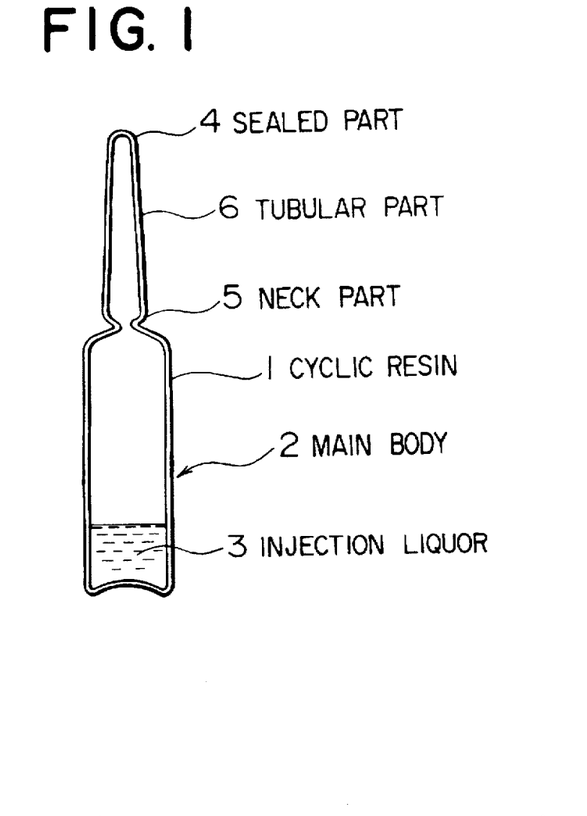
FIG. 1 is a cross-sectional view of an ampoule container consisting of a cyclic resin, filled with a liquid medicament.

Each of the thus formed ampoules was washed with purified water and alcohol and dried, charged with an injection liquor of ascorbic acid (according to the standard of JP) and sealed as shown in FIG. 1. The ampoule of FIG. 1 comprises a cyclic resin 1 of the present invention, a container body 2, an injection liquor 3, a fused seal part 4, a narrower neck part 5 and a narrow and long tube part 6. This medicament-charged ampoule was placed in an autoclave, in the bottom of which distilled water was charged and then subjected to a deterioration accelerating treatment (according to ASTM D572) at an oxygen pressure of 10 kg/cm$^2$ and a temperature of 60° C. for 48 hours. The quantitative determination of ascorbic acid was carried out according to JP 11. That is, the sample was subjected to titration with a 2,6-dichlorophenol/indophenol Na test solution until light red color lasted for 5 seconds. When the initial charge was 10%, the residual amount (%) after the deterioration treatment was shown in Table 3.

As to PE, PP and PET, ampoules were prepared in the similar manner to Examples 1 to 8 and deterioration of ascorbic acid in the container was accelerated to determine the residual amounts (Comparative Examples 1 to 3). The results are shown in Table 3.

For comparison, a similar test was carried out on a commercially available glass ampoule (Comparative Example 3). The results are also shown in Table 3.

TABLE 3

| | Resin of Ampoule | Residual Amount of Ascorbic acid (%) |
|---|---|---|
| Example | | |
| 1 | (a) | 75 |
| 2 | (c) | 70 |
| 3 | (d) | 70 |
| 4 | (f) | 80 |
| 5 | (e) | 75 |
| 6 | (g) | 60 |
| 7 | (a) + PE① | 55 |
| 8 | (g) + EVA② | 65 |
| Comparison | | |
| 1 | PE③ | 20 |
| 2 | PP④ | 10 |
| 3 | PET⑤ | 40 |
| 4 | glass⑥ | 90 |

The marks in Table 3 are as follows:
①L-LDPE (Ultozex -commercial name- made by Mitsui Sekiyu Kagaku KK) was added in a proportion of 20 parts by weight and plasticized.
②10 parts by weight of a partially saponified product having an ethylene content of 80 weight % and a melting point of about 170–200° C. (Petrocene 282 -commercial name- made by Toyo Soda Kogyo KK) was mixed and plasticized.
③LDPE (Sumikacene G 201 -commercial Name- made by Sumitomo Kagaku KK)
④Ethylene-propylene copolymer having an ethylene content of 5 weight % (Modic P-300 F -commercial name- made by Mitsubishi Yuka KK)
⑤TR-4550 -commercial name- made by Teijin KK
⑥A commercially available glass was washed and used.

This test was an accelerated aging test to determine decomposition of ascorbic acid with oxygen and moisture by passing an amouple resin through an atmosphere at a humidity of 100% and temperature of 60° C. As is evident from the results of Table 3, the article of the present invention shows a higher residual amount of ascorbic acid as compared with PE, PP and PET and there is also a difference among the examples of the present invention. In Example 7 using jointly Resin (a) and PE, the residual amount of ascorbic acid is smaller than the ampoule of only Resin (a) and in Example 9 using jointly Resin (g) and EVA, the residual amount is larger than the case of only Resin (g). The resin ampoule of the present invention has a smaller residual amount than the commercially available glass ampoule.

Furthermore, a vial bottle can be injection molded by the use of a metallic mold of vial type in place of the ampoule mold.

Examples 9 to 12

Inside Treating Test of Glass Container

A mixture of γ-glycidoxypropyltrimethoxysilane and N-β-(aminoethyl)-γ-aminopropylmethyl-dimethoxysilane was spread and uniformly coated onto the inner surface of a vial of soda-lime glass and the cyclic resin of the present invention was laminated onto the coated surface by blowing, followed by heating and fusion-bonding at a temperature of 160°±5° C. for about 5 minutes. The inside of the vial was washed with purified water. Thus, an article with a thickness of about 10 μm (referred to as a α) was obtained.

Figure 2A:
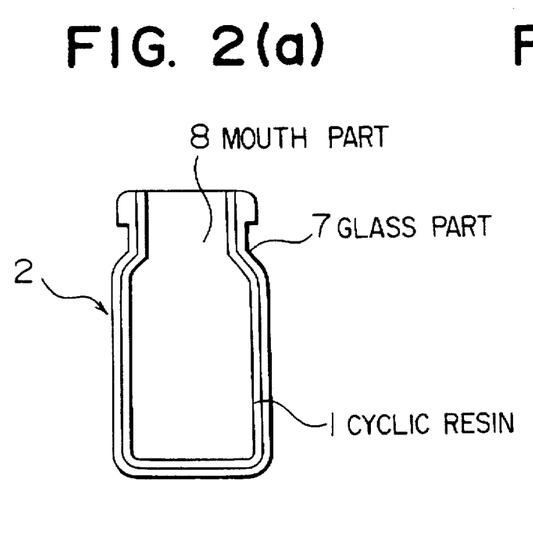
FIGS. 2a&b are cross-sectional views of a container consisting of a glass vial the inner surface of which is laminated with a cyclic resin of the present invention.
Figure 2B:
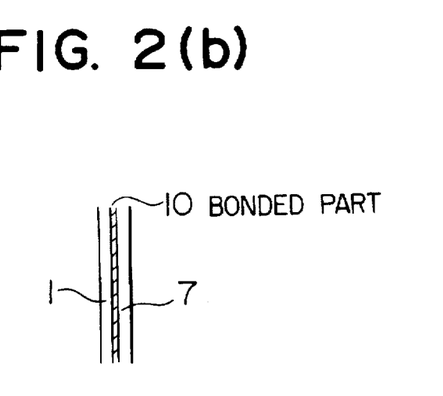

On the other hand, vinyltris(t-butyl-oxy)silane was spread and uniformly coated, as a primer, on another vial bottle and the cyclic resin of the present invention was laminated onto the coated surface by blowing, followed by treating in an analogous manner to the case of the article α, thus obtaining another article with the similar thickness (referred to as β). This article comprises a cyclic resin 1 of the present invention, a bottle body 2, a glass part 7 and a mouth part 8, as shown in FIG. 2. FIG. 2 (b) shows a partially cross-sectional view of a thermally fusion-bonded part 10 of a mixed resin and/or adhesives.

The thus prepared articles were subjected to a test according to JP 11, i.e. "27. Test Method of Glass Container for Injection (ii) Second Method". Accordingly, distilled water was charged in a bottle in a proportion of 90 volume %, heated at a temperature of 121° C. for 20 hours and the water was titrated with 0.02N sulfuric acid to obtain results shown in Table 4.

In addition, another test was carried out according to JP 12, "48. Test Method of Plastic Container for Transfusion" to obtain results shown in Table 5.

TABLE 4

| | Laminated Resin | Titre (ml) of 0.02N H$_2$SO$_4$ (JP 11: <0.10 ml) |
|---|---|---|
| Example | | |
| 9 | α of (d) | 0.05 |
| 10 | β of (d) | 0.05 |
| 11 | α of (f) | 0.05 |
| 12 | β of (f) | 0.05 |
| Comparison | | |
| 5 | no | 0.4 |

TABLE 5

| Items | Example 9 | Example 12 | Standard Value of JP 12 |
|---|---|---|---|
| Laminated Resin | α of (d) | β of (f) | |
| Lead | <0.05 | <0.05 | |
| Cadmium | <0.01 | <0.01 | |
| Appearance | 99.7 | 99.5 | colorless and clear |
| Bubbling | 0.5 | 1.0 | within 3 minutes |
| pH | 0.3 | 0.4 | <1.5 |
| Chloride | <0.5 | <0.5 | |
| SO$_4$ salt | <0.5 | <0.5 | |
| PO$_4$ salt | <0.3 | <0.3 | |
| NH$_3$ salt | <0.2 | 0 | |
| KMnO$_4$ Reducing Material (ml) | 0.1 | 0.2 | <1.0 ml |
| Evaporation Residue (mg) | 0.05 | 0.05 | <1.0 mg |
| UV Absorption Spectrum | 0.03 | 0.03 | <0.05 |
| Acute Toxity Test | nothing unusual | nothing unusual | nothing unusual |
| Feverish Test | adapted | adapted | adapted |
| Hemolytic Test | no | no | no |
| Transplantation | nothing unusual | nothing unusual | adapted |

As shown in Table 4, in Comparative Example 5, the elution quantity of alkali from the vial of soda-lime glass according to JP 11 is larger, while in Examples 9 to 12 in which the cyclic resin film of the present invention is laminated inside, the elution of alkali was prevented. As shown in Table 5, the resin film of the present invention stands the sanitary test applied to PE and PP according to JP 12.

Examples 13 to 19

Container for Transfusion

The resin of the present invention was heated and plasticized in a screw of an extruder, extruded through a die and passed through several rolls to form a film (called T-die method). Another resin as shown in Table 6 was formed into a film by the T-die method. Before both the films were cooled, they were passed through rolls to form laminated films, if necessary, using adhesives. On the other hand, commercially available films were formed into laminated films in the similar manner. The total thickness of the laminated films was about 0.2 mm.

Figures 3A, 3B:
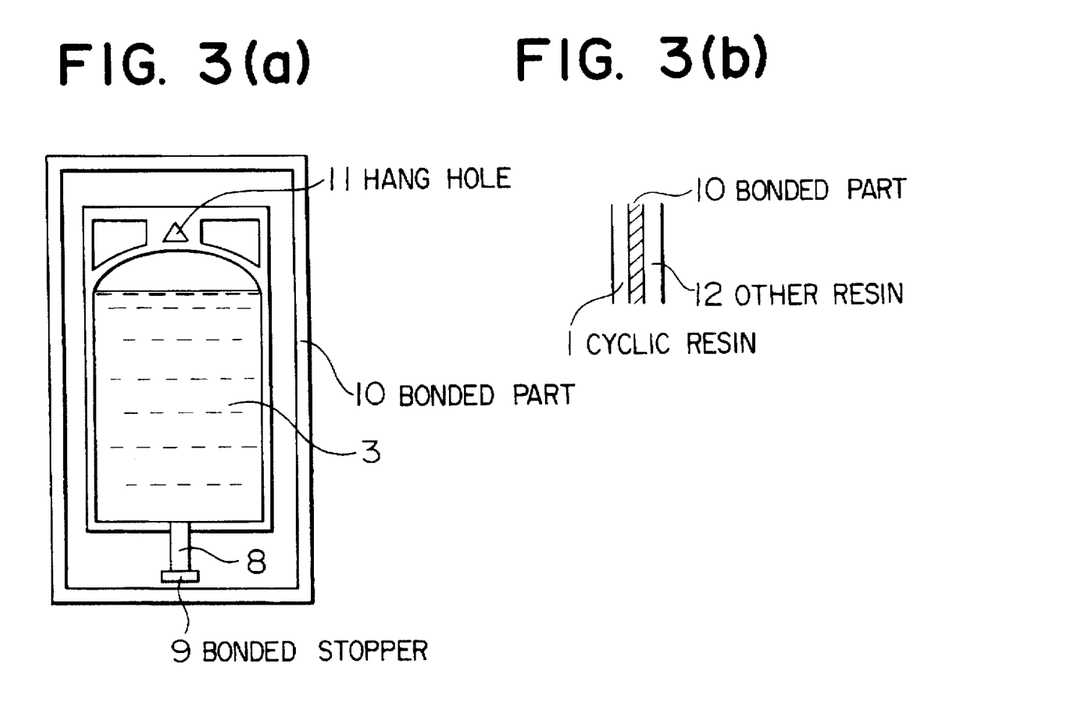

The thus prepared film was converted into a soft container for liquid transfusion as shown in FIG. 3 (a), cross-sectional view and FIG. 3 (b), enlarged view of laminated part, in which a thermally fusion-bonded part 10 was composed of a mixed resin and/or adhesives. The names of the laminated resins and properties thereof are shown in Table 6, in which the estimation is designated by marks: ⊙=best (at most 0.5), ○=better (at most 1), Δ=good (at least 1) and X=no good.

TABLE 6

| | Resin of Present Invention (inner layer) | Other Resin to be Laminated (outer layer) | Adhesives | Properties of Laminate[1] | |
|---|---|---|---|---|---|
| | | | | Oxygen Permeability | Steam Permeability |
| Example | | | | | |
| 13 | (a) + (f) 3:1 | nylon[2] | no | ○ | ○ |
| 14 | (b) + (g) 3:1 | EVA[3] | no | ○ | ○ |
| 15 | (d) | stretched nylon[4] | [5] | ○ | ○ |
| 16 | (d) | PVDC[6] | [7] | ○ | ○ |
| 17 | (d) | EVOH[8] | EVA[3] | ○ | Δ |
| 18 | stretching (f) | stretched nylon[4] | no | ⊙ | ○ |
| 19 | (d) | [9] | no | ⊙ | ○ |
| 20 | (d) + PE[12] 4:1 | [10] | no | Δ | ○ |
| Comparison | | | | | |
| 6 | PP[11] | no | no | X | ○ |
| 7 | PE[12] | no | no | X | ○ |

The details of Table 6 are as follows:
[1] Oxygen Permeability: ASTM-D 1434-58, double type gas cc/m² · day · atm
Steam Permeability: JIS-Z-0208, measured from weight increase by cup method at 40° C. and 90% RH, g/m² · day
[2] Nylon MXD 6 (commercial name), made by Mitsubishi Gas Kagaku KK
[3] Soarnol E (commercial name), made by Nippon Gosei Kagaku Kogyo KK ethylene vinyl acetate copolymer saponified resin
[4] Santoneal (commercial name), made by Mitsubishi Monsanto Kasei KK, biaxially stretched nylon
[4] Emblem (commercial name), made by Unitika KK
[5] Himilan (commercial name), made by Mitsui DuPont Polychemical KK, ethylene ethylacrylate metal salt
[6] KF polymer (commercial name), made by Kureha Kagaku KK
[7] Takeluck A-310 or Takeluck A-3 (commercial name), made by Takeda Yakuhin KK, urethane type adhesives
[8] EVAL-E (commercial name), made by Kurare KK, ethylene-vinyl alcohol copolymer
[9] Saran UB (commercial name), made by Asahi Kasei KK, vinylidene chloride/acrylic acid ester
[10] Admer QB 01 (commercial name), Mitsui Sekiyu Kagaku KK, propylene/ethylene block copolymer
[11] Biren Film (commercial name), made by Toyobo KK
[12] Novatex L-300 (commercial name), Mitsubishi Kasei KK, low density PE As shown in Table 6, when the cyclic resin of the present invention is laminated with another resin, the oxygen permeability is much less than that of PE and PP films. The diffrence in oxygen permeability depends on the variety of laminated films. The order of the oxygen permeability is Example 17<Example 16<Examples 13, 14 and 15, but the difference is so small that the estimation marks are the same. The difference in steam permeability is so small that the estimation marks are the same.

When a salt solution for injection is charged in a container for liquid transfusion of the present invention and subjected to steam sterilization at a high pressure (temperature: 115°–120° C. for 30 minutes), there were found nothing unusual, i.e. no fusion-bonding, deformation and whitening in the containers in any Examples. Therefore, the soft container for transfusion according to the present invention can favorably be applied to transfusion of formulations of vitamines, sugars, electrolytes, amino acids, high calorie liquors and the like, and can be a sanitary container capable of dripping the liquid formulation by deforming the drum part of the container without feeding air therein.

When the laminated resin is rendered thicker and bonded with aluminum film, the container can be applied to PTP (press through pack).

Example 21

Figure 4:
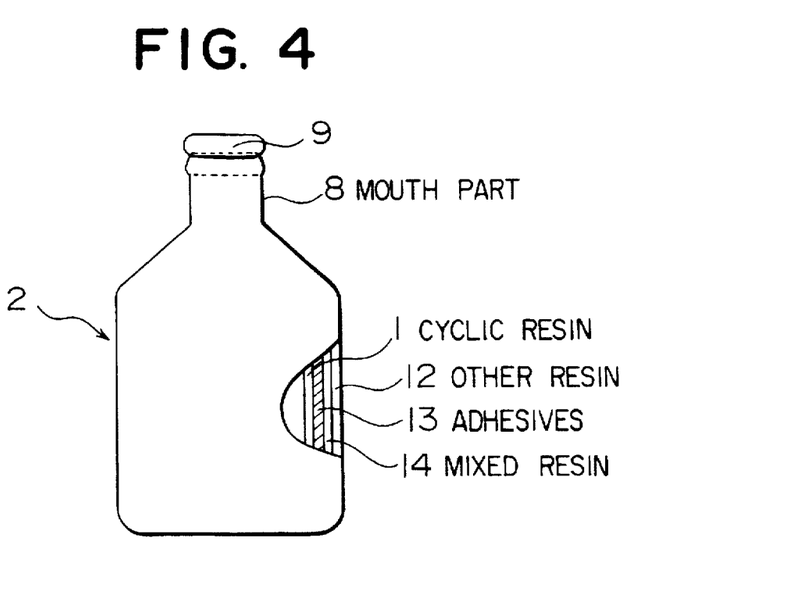
FIG. 4 is a cross-sectional view of a bottle consisting of a cyclic resin of the present invention.

Formation of Bottle and Estimation 100 parts by weight of PP (Modic P-300 F—commercial name—made by Mitsubishi Yuka KK), 10 parts by weight of a polyethylene grafted with 3 weight % of maleic anhydride and 0.2 part by weight of Irganox 1076 were mixed by means of Henshel Mixer and fed to an extruder, during which EVOH (ethylene content 30 mol %, EVAL F—commercial name—made by Kurare KK) was fed to a second extruder for an intermediate layer, a mixture of EVOH and Resin (a) (1:2) was fed to a third extruder and Resin (a), as an inner layer, was fed to a fourth extruder to form a parison cylinder. This parison was subjected to a blow metallic mold of bottle type and stretched and formed in a bottle by blowing nitrogen gas at a pressure of 15 kg/cm² and a temperature of 145° to 170° C., thus obtaining a multi-layer bottle of 500 ml in inner volume as shown in FIG. 4, comprising the cyclic olefin resin 1 of the present invention, bottle body 2, bottle mouth 8, fusion-bonded stopper 9, another resin 12, adhesives or thermal fusion-bonded part 13 and mixed resin 14. The bottle was washed and dried.

Soya bean oil was charged in the resulting bottle, enclosed by fusion-bonding a stopper, allowed to stand at room temperature (25°–30° C.) for 2 months and then the peroxide value of the soya bean oil was determined by a method provided by Nippon Yushi Kyokai (Japanese Oils and Fats Association) comprising dissolving 1 g of a sample in a mixed solution of acetic acid and chloroform, to which 1 ml of a saturated solution of KI was added, allowing the resulting mixture to stand for 10 minutes, to which 30 ml of water was then added, shaking the resulting mixture and then titrating with a 0.01N solution of $Na_2S_2O_3$. The determined value was 1.5. When a commercially available PP container was subjected to the similar test, the peroxide value was 3.0. The iodine number of soya bean oil is 125.

Example 22

Estimation of Bottle Formation

A parison of hollow rube type was formed by feeding an ethylene-propylene copolymer resin (ethyelene content: 8 mol %, made by Mitsubishi Yuka KK) to an extruder for an outer layer, feeding a mixed resin of nylon resin (Grillamide TR 25—commercial name—made by Mitsubishi Kasei KK) and PE (Ultozet—commercial name—made by Mitsui Sekiyu Kagaku KK) (4:1) to a second extruder, feeding a plasticized mixture of the above described nylon resin and Cyclic Resin (b) of the present invention in a proportion of 1:2 to a third extruder and then feeding Resin (b) of the present invention to a fourth extruder for an inner layer. Nitrogen gas was blown thereinto in an analogous manner to Example 21, thus stretching and forming a bottle as shown in FIG. 4.

The the resulting bottle was washed, dried, charged with soya bean oil and then subjected to the similar test to Example 21, thus obtaining a peroxide value of 1.9 after 2 months.

The Food Sanitation Act, Standard 3 of Instruments and Containers or Packages, provides that instruments, containers or packages of synthetic resins containing PE and PP as polymeric components should have an evaporation residue of at most 30 ppm. The bottles of Examples 21 and 22 showed respectively an evaporation redisue of at most 1 ppm.

Example 23

Bottle Formation

Figure 5A:
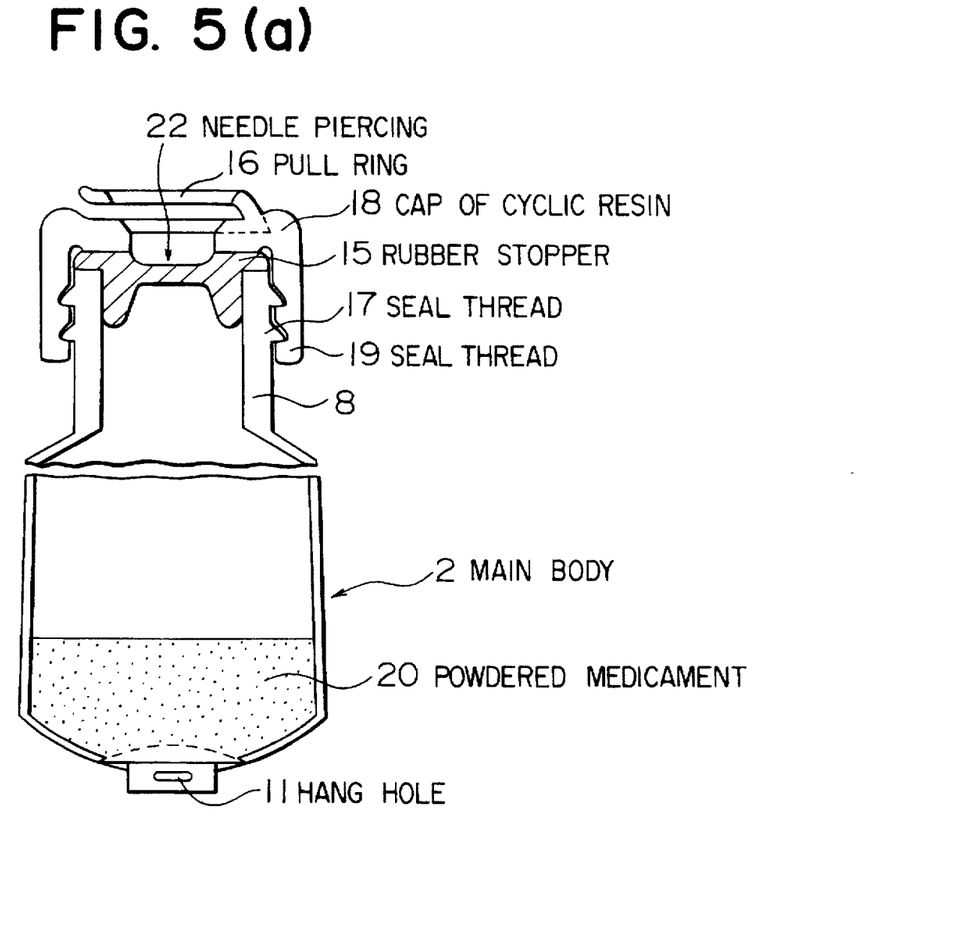
Figure 5B:
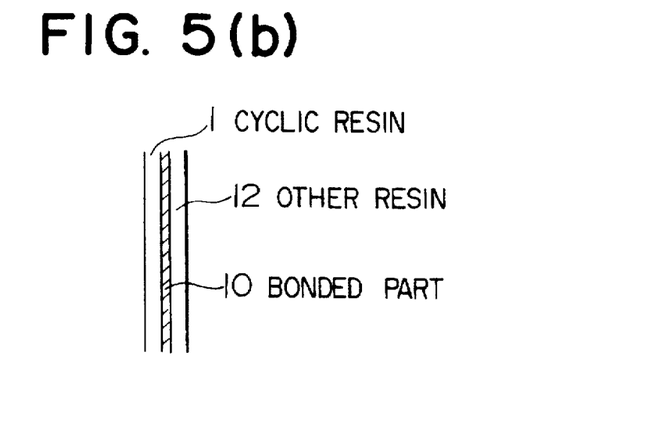

PET (Bayron GM—commercial name—made by Toyobo KK), a mxed resin of maleic anhydride-modified ethylene polymer (maleic anhydride content: 1 weight % made by Mitsubishi Yuka KK) and Nylon MXD 6 (commercial name, made by Mitsubishi Gas Kagaku KK) (1:1) and Cyclic Resin (f) of the present invention were separately fed to separate injection extruders (cylinder temperature: 260°–280° C.) and a bottom-having parison was formed at a mold temperature of about 80° C. This parison was then formed into a bottle shown in FIG. 5 using a biaxially stretching and shaping machine at a temperature of 160° to 180° C. and a nitrogen pressure of about 20 kg/cm$^2$. FIG. 5 (b) is a partially cross-sectional view of the bottle body (a), showing a fusion-bonded part 10 comprising a mixed resin and/or an adhesives.

In the bottle used for a powdered medicament, as shown in FIG. 5, a bottle mouth part 8 is enclosed by a rubber stopper 15, on which a cap 18 of the cyclic resin of the present invention, provided with a pull ring 16, is fixed. When using a powdered medicament 20, an injection needle is pierced in the rubber stopper 15, distilled water for injection is added to the container to dissolve the powder 20 and the container is further used in a transfusion set for dripping the resulting medicament solution. Thus, the container can be used as a container for sanitarily dosing a liquid medicament.

Example 24

Bottle Formation

Resin consisting of a mixture of 75 parts by weight of Soarnol E (commercial name, made by Nippon Gosei Kagaku KK, 90% saponified product of vinyl acetate) and 25 parts by weight of a modified low density polyethylene (Admer QB—commercial name—Mitsui Sekiyu Kagaku KK) was used for an intermediate layer. Cyclic Resin (d) of the present invention was laminated on both the surfaces of the intermediate layer and formed into a bottom-having multilayer parison by an injection molding machine (cylinder temperature: 250°–280° C.). The parison container was then subjected to biaxially stretching blow molding by blowing nitrogen gas at a temperature of 140° to 160° C. and a pressure of 15 kg/cm$^2$ to obtain a bottle with an inner volume of 500 ml, shown in FIG. 5.

Example 25

Bottle (small quantity sample)

Figure 6:
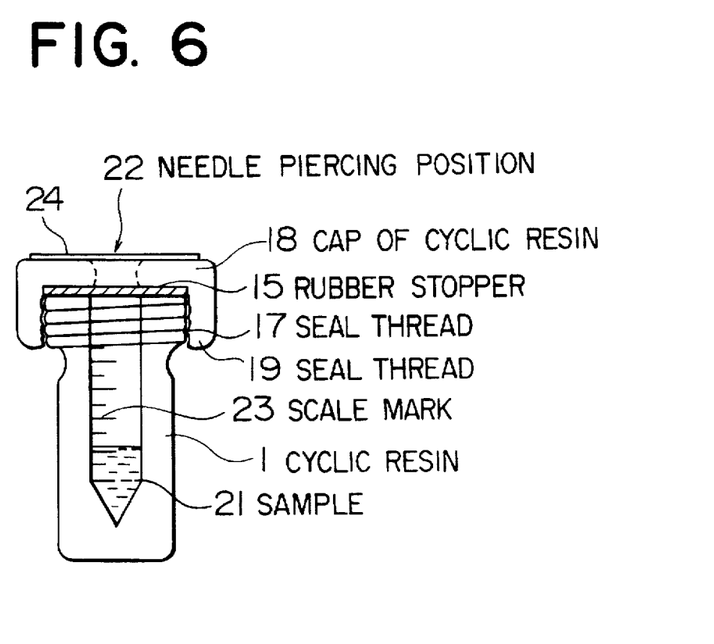
FIG. 6 is a schematic view of a container for a small quantity sample, consisting of a cyclic resin as one embodiment of the present invention.

100 parts by weight of Cyclic Resin (c) of the present invention was mixed with 20 parts by weight of an isoprene-isobutylene copolymer rubber (JSR Butyl 268—commercial name—handled by JSR) and subjected to injection molding at a temperature of 230° to 260° C. to mold a small quanity container, as shown in FIG. 6. A sample 21 of 1 ml or less could be taken from this container by an injector. 22 designates an injection needle piercing position, 23 a scale mark and 24 a fusion-bonded sheet. This container gave a high quality warranty to the sample.

According to the present invention, a sanitary container is prepared from a material containing a resin comprising, as a polymeric component, a cyclic olefin compound or bridged polycyclic hydrocarbon compound, or by laminating the surface of a container of metals, plastics, etc. with the same resin, whereby the following advantages or merits can be obtained:

(1) The effect of maintaining the initial quality of contents such as foods, nutriments, pharmaceuticals, cosmetics, seasonings, etc. is large.
(2) The container is inert to acid or alkali solutions and meets with less stripping of fine particles, etc. from the surface of the container and less adsorption on the surface thereof, thus having a high sanitary property.
(3) Influences upon contents by individual or overall external factors i.e. environments such as heat, oxygen, air, humidity (moisture), lights (ultraviolet rays) and the like, and outer forces can be reduced.
(4) The container stands the official tests such as by JP 12, USP, BS, ISO, Official Notification of the Ministry of Health and Welfare, etc.

What is claimed is:

1. A container for a sanitary article wherein at least the inner surface thereof is made of a resin material consisting essentially of a resin formed from at least 30%, by weight, based upon the weight of the resin, of a cyclic olefin compound having at least five carbons or a bridged polycyclic hydrocarbon compound, as a polymeric component, said resin having a softening point of at least 130° C. and a bromine number of at most 1.

2. The container for a sanitary article as claimed in claim 1, wherein the cyclic olefin compound is at least one member selected from the group consisting of monocyclic olefin compounds, alkyl derivatives of monocyclic olefin compounds, and acrylate derivatives of monocyclic olefin compounds.

3. The container for a sanitary article as claimed in claim 1, wherein the bridged polycyclic hydrocarbon compound has at least one unsaturated bond in the ring or in a substituent on the ring.

4. The container for a sanitary article as claimed in claim 1 wherein the resin formed of a cyclic olefin compound or a bridged polycyclic hydrocarbon compound, as a polymeric component, contains at least one member selected from the group consisting of lower olefins, aromatic compounds, vinyl monomers of lower olefins and vinyl monomers of aromatic compounds, as a copolymeric component.

5. The container for a sanitary article as claimed in claim 1, wherein the container has at least one laminated layer on the surface thereof, the laminated layer consisting of a material containing the resin formed of a cyclic olefin compound or a bridged polycyclic hydrocarbon compound, as a polymeric component.

6. The container for a sanitary article as claimed in claim 5 wherein the material containing the resin formed of a cyclic olefin compound or a bridged polycyclic hydrocarbon compound, as a polymeric component, is laminated on the inner surface of a glass container, metallic container or plastic container.

7. The container for a sanitary article as in claim 5, wherein the resin is a copolymer of a cyclic olefin compound or a bridged polycyclic hydrocarbon compound and at least one member selected from the group consisting of lower olefins, aromatic compounds, vinyl monomers of lower olefins and vinyl monomers of aromatic compounds.

8. The container according to claim 7, wherein the resin is a mixture of said copolymer and at least one member selected from the group consisting of olefinic resins and synthetic rubbers.

9. The container according to claim 1 which is made entirely of a copolymer of a cyclic olefin compound or a bridged polycyclic hydrocarbon compound and at least one member selected from the group consisting of lower olefins, aromatic compounds, vinyl monomers of lower olefins and vinyl monomers of aromatic compounds.

10. The container for a sanitary article as claimed in claim 1, wherein the cyclic olefin compound from which the resin is formed is a monocyclic olefin compound.

* * * * *